Patented Oct. 8, 1940

2,217,612

UNITED STATES PATENT OFFICE 2,217,612

TERPENE-CYANOACYL COMPOUND AND METHOD OF PRODUCING SAME

Joseph N. Borglin, Wilmington, Del., assignor to Hercules Powder Company, Wilmington, Del., a corporation of Delaware No Drawing. Application December 27, 1939, Serial No. 311,166

16 Claims. (Cl. 260—454)

This invention relates to a method of preparing thiocyanoacyl, selenocyanoacyl, and tellurocyanoacyl esters from terpene alcohols. More particularly it relates to the application of this method of hydroterpineol, and to the esters produced thereby.

By the method in accordance with this invention, I react a hydroterpineol with a suitable halogen substituted acylating agent and then with a metal thiocyanate, a metal tellurocyanate, or a metal selenocyanate which is reactive under the conditions employed.

The hydroterpineol may be prepared by the hydrogenation of terpineol or a terpene fraction rich in terpineol, for example, in the manner described by Behal (Compte Rendu 150, 1762 (1910)) and also by Sabatier and Gaudion (Compte Rendu 168, 671 (1918)). The hydroterpineol may be derived from the alpha-, beta-, or gamma-forms of terpineol. Thus the term "hydroterpineol" includes the alpha-, beta-, and gamma- forms.

Among the suitable halogen substituted acylating agents which I may use are halogen substituted carboxylic acid anhydrides, halogen substituted acyl halides, and halogen substituted carboxylic acids. Suitable halogen substituted carboxylic acid anhydrides which I may utilize are, for example, monochloroacetic anhydride, dichloroacetic anhydride, trichloroacetic anhydride, alpha-chloropropionic anhydride, beta-chloropropionic anhydride, dichloropropionic anhydride, alpha-, beta-, or gamma-chlorobutyric anhydride, dichlorobutyric anhydride, chlorobenzoic anhydride, chlorolauric anhydride, chlororicinoleic anhydride, chlorostearic anhydride, chloropalmitic anhydride, chloroleic anhydride, chloromalonic anhydride, chlorophthalic anhydride, etc. or the corresponding bromine, iodine, and fluorine substituted acid anhydrides. Suitable halogen substituted acyl halides which I may use are, for example, monochloroacetyl chloride, dichloroacetyl chloride, trichloroacetyl chloride, alphachloropropionyl chloride, beta-chloropropionyl chloride, dichloropropionyl chloride, alpha-, beta-, or gamma-chlorobutyryl chloride, dichlorobutyryl chloride, chlorobenzoyl chloride, chlorolauryl chloride, chlorostearyl chloride, chlororicinoleyl chloride, chloromysteryl chloride, chloropalmityl chloride, chloromalonyl chloride, chlorophthalyl chloride, etc. or any such acyl halide in which the chlorine substituent or acyl chloride atom is replaced by bromine, iodine, or fluorine instead of the chlorine, or in which both substituent and acyl halide chlorine atoms are replaced by other halogen atoms. Suitable halogen substituted organic acids are such as, for example, those acids corresponding to the anhydrides and acyl halides hereinabove mentioned. Mixtures of acylating agents may be used, if desired.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make a selenocyanoacylate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The hydroterpineol will first be reacted with the halogen substituted carboxylic acid anhydride, the halogen substituted acyl halide, or the halogen substituted carboxylic acid, and the resulting ester isolated from any by-products of the reaction. Preferably any acidic material present will also be removed. The second stage consists in treating this ester with a metallic thiocyanate, selenocyanate, or tellurocyanate, as the case may be, and recovering the product. I prefer to carry out the second stage in the presence of a suitable inert solvent such as methanol, ethanol, propanol, isopropanol, butanol, acetone, ethyl acetate, etc. Each of these stages of my process may be carried out at a temperature within the range between about 0° C. and about 250° C. but preferably at a temperature within the range between about 60 and about 150° C.

The product obtained is a hydroterpineol ester having the type formula ROOCR'XCN in which R is a radical of hydroterpineol, R' is an aliphatic or aromatic radical, and X is sulfur, selenium, or tellurium. The product may be, for example, a thiocyanoacyl ester in which the halogen substituent of the acylating agent used in the first stage has been replaced by an SCN group.

The halogen substituted acylates of the first stage reaction are light in color if the reaction is carried out in the absence of oxygen, for example, under a blanket of $CO_2$. Substantially water-white esters may be obtained by vacuum distillation. The color of the thiocyanoacylate products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

Terpene alcohols other than hydroterpineol may also be treated to give thio, seleno, and tellurocyanoacylates by the method of reacting the terpene alcohol with a halogen substituted carboxylic acid anhydride or a halogenated acyl halide followed by treatment with a metal thiocyanate, selenocyanate, or tellurocyanate as disclosed herein. For example, terpineol, borneol, isoborneol, fenchyl alcohol, geraniol, nerol, linalool, terpin, sobrerol, glycol monoterpinyl ether, glycerol mono or diterpinyl ether, etc. may be treated in this way. The "R" in the type formula of the product hereinabove mentioned will then be respectively a terpinyl, bornyl, isobornyl, fenchyl, etc. radical.

The method in accordance with this invention will be further illustrated by the examples which follow. In the examples all parts and percentages are by weight unless otherwise specified.

Example 1

A mixture of 25 parts of hydrogenated terpineol and 20.5 parts of beta-chloropropionyl chloride was heated under reflux in a bath at a temperature of 115–125° C. for 7.5 hours. 24 parts of petroleum ether was then added and the resulting solution was washed free of acid with water. The solvent was removed by heating under reduced pressure. A yield of 25.5 parts of hydroterpineol chloropropionate which analyzed 16.2% chlorine was obtained.

21 parts of this ester, 8 parts of sodium thiocyanate, and 32 parts of 95% ethyl alcohol were mixed and heated under reflux for 6 hours in an oil bath at 115–125° C. After adding about 28 parts of petroleum ether to the reaction mixture, it was washed free of sodium thiocyanate with water. Volatile solvents were then removed by distillation at reduced pressure. A yield of 18 parts of product which analyzed 7.0% sulfate, containing the hydroterpineol thiocyanopropionate, was obtained.

Example 2

A mixture of 20 parts of hydrogenated terpineol (which had a refractive index of 1.4628 at 20° C.) and 15 parts of chloroacetyl chloride was heated on a steam bath under reflux for 2 hours. The resulting mixture was extracted with about 14 parts of petroleum ether and the ether layer was washed acid free with water. The petroleum ether was then removed from the extract by evaporation under reduced pressure. A yield of 23 parts of pale liquid hydroterpinyl chloroacetate analyzing 19.2% chlorine was obtained.

15.5 parts of the chloroacetate was mixed with 8.7 parts of sodium thiocyanate and 32 parts of ethyl alcohol and the mixture was heated under reflux for 9.5 hours in an oil bath at 105–115° C. About 21 parts of petroleum ether was added to the reaction mixture which was then washed with water until free of sodium thiocyanate. Volatile solvents were then removed by heating under reduced pressure. A yield of 14 parts of product analyzing 8.6% sulfur, containing the hydroterpinyl thiocyanoacetate, was obtained.

Example 3

A mixture of 25 parts of hydrogenated terpineol which had a refractive index of 1.4628 at 20° C., 25 parts of alpha-chloropropionic acid, and 5 parts of anhydrous sodium acetate was heated for about 7½ hours at 125–130° C. The reaction mixture was then extracted with 35 parts of petroleum ether and the ether layer resulting was then washed free of acid with water. The ether was then evaporated at a reduced pressure to give the product containing hydroterpinyl chloropropionate.

20 parts of this product was mixed with 1.5 parts of sodium thiocyanate and 20 parts of 95% ethyl alcohol and the mixture refluxed for about 8 hours. The product was recovered in the same manner as in Example 1 using 21 parts of petroleum ether. 13 parts of product containing the hydroterpinyl thiocyanopropionate were recovered.

Example 4

A mixture of 187 parts of hydroterpineol, 100 parts of chloroacetic acid, and 82 parts of acetone was refluxed for 16 hours. The reaction mixture was then washed with water to remove the acetone and excess chloroacetic acid. A yield of 160 parts of products containing hydroterpinyl chloroacetate was obtained.

158 parts of the above product was mixed with 100 parts of potassium thiocyanate and 160 parts of 95% ethyl alcohol and the mixture was refluxed for 8 hours. The reaction product was then washed with water until potassium thiocyanate was removed. A yield of 132 parts of product containing the hydroterpinyl thiocyanoacetate was obtained.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure.

This application is a continuation-in-part of my previous application, Serial No. 198,687, filed March 29, 1938, entitled "Terpene-cyanoacyl compounds and methods of proudcing same."

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a hydroterpinyl radical, R' is a radical selected from the group consisting of aliphatic and aromatic radicals, and X is a member of the group consisting of sulfur, selenium, and tellurium.

2. A hydroterpinyl thiocyanoacylate.

3. A hydroterpinyl thiocyanoacylate, the acyl group being derived from a lower aliphatic carboxylic acid.

4. A hydroterpinyl thiocyanoacetate.

5. A hydroterpinyl thiocyanopropionate.

6. A hydroterpinyl thiocyanobutyrate.

7. A method for the preparation of terpene thiocyanoacylates, selenocyanoacylates, and tellurocyanoacylates which comprises reacting a terpene alcohol with a suitable acylating agent selected from the group consisting of halogen substituted carboxylic acid anhydrides and halogen substituted acyl halides and then with a compound from the group consisting of metal thiocyanates, metal selenocyanates, and metal tellurocyanates at least partially soluble in the reaction mixture.

8. A method for the preparation of terpene thiocyanoacylates which comprises reacting a terpene alcohol with a suitable acylating agent selected from the group consisting of halogen substituted carboxylic acid anhydrides and halogen substituted acyl halides and then with a metal thiocyanate at least partially soluble in the reaction mixture.

9. A method for the preparation of terpene thiocyanoacylates, selenocyanoacylates, and tellurocyanoacylates which comprises reacting a terpene alcohol with a chlorinated aliphatic carboxylic acid anhydride and then with a compound from the group consisting of metal thiocyanates, metal selenocyanates, and metal tellurocyanates at least partially soluble in the reaction mixture.

10. A method for the preparation of terpene thiocyanoacylates, selenocyanoacylates, and tellurocyanoacylates which comprises reacting a terpene alcohol with a chlorine substituted aliphatic acyl halide and then with a compound from the group consisting of metal thiocyanates, metal selenocyanates, and metal tellurocyanates at least partially soluble in the reaction mixture.

11. A method for the preparation of terpene thiocyanoacylates, selenocyanoacylates, and tellurocyanoacylates which comprises reacting a saturated terpene alcohol with a suitable acylating agent selected from the group consisting of halogen substituted carboxylic acid anhydrides and halogen substituted acyl halides and then with a compound from the group consisting of metal thiocyanates, metal selenocyanates, and metal tellurocyanates at least partially soluble in the reaction mixture.

12. A method for the preparation of terpene thiocyanoacylates, selenocyanoacylates, and tellurocyanoacylates which comprises reacting hydroterpineol with a suitable halogen substituted acylating agent and then with a compound from the group consisting of metal thiocyanates, metal selenocyanates, and metal tellurocyanates at least partially soluble in the reaction mixture.

13. A method for the preparation of terpene thiocyanoacylates which comprises reacting hydroterpineol with a suitable halogen substituted acylating agent and then with a metal thiocyanate at least partially soluble in the reaction mixture.

14. A method for the preparation of terpene thiocyanoacylates which comprises reacting hydroterpineol with a chlorine substituted aliphatic carboxylic acid anhydride and then with an alkali metal thiocyanate.

15. A method for the preparation of terpene thiocyanoacylates which comprises reacting hydroterpineol with a chlorine substituted aliphatic acyl halide and then with an alkali metal thiocyanate.

16. A method for the preparation of the terpene thiocyanoacylates which comprises reacting hydroterpineol with a chlorine substituted aliphatic carboxylic acid and then with an alkali metal thiocyanate.

JOSEPH N. BORGLIN.